United States Patent
Lee

(10) Patent No.: US 9,144,957 B2
(45) Date of Patent: Sep. 29, 2015

(54) INSERT SHEET FOR AN AUTOMOBILE INTERIOR MATERIAL, AND A PRODUCTION METHOD FOR THE SAME

(75) Inventor: Min-Ho Lee, Busan (KR)

(73) Assignee: LG HAUSYS, LTD., Seoul (KR)

( * ) Notice: Subject to any disclaimer, the term of this patent is extended or adjusted under 35 U.S.C. 154(b) by 178 days.

(21) Appl. No.: 13/810,530

(22) PCT Filed: Jul. 6, 2011

(86) PCT No.: PCT/KR2011/004945
§ 371 (c)(1),
(2), (4) Date: Jan. 16, 2013

(87) PCT Pub. No.: WO2012/015178
PCT Pub. Date: Feb. 2, 2012

(65) Prior Publication Data
US 2013/0114276 A1    May 9, 2013

(30) Foreign Application Priority Data

Jul. 30, 2010 (KR) .......... 10-2010-0073851

(51) Int. Cl.
*B32B 27/08* (2006.01)
*B60Q 1/00* (2006.01)
(Continued)

(52) U.S. Cl.
CPC .......... *B32B 27/08* (2013.01); *B29C 45/14811* (2013.01); *B32B 7/12* (2013.01); *B32B 27/06* (2013.01); *B32B 27/302* (2013.01); *B32B 27/306* (2013.01); *B32B 27/34* (2013.01); *B32B 27/36* (2013.01); *B32B 27/40* (2013.01); *B32B 37/02* (2013.01); *B32B 37/025* (2013.01);
(Continued)

(58) Field of Classification Search
CPC .......... B32B 27/08; B32B 37/02; B60Q 1/00
See application file for complete search history.

(56) References Cited

U.S. PATENT DOCUMENTS

2005/0183305 A1*   8/2005   Hirata et al. ................ 40/615
2005/0255314 A1   11/2005   Wang et al.
(Continued)

FOREIGN PATENT DOCUMENTS

| | | |
|---|---|---|
| CN | 101479095 A | 7/2009 |
| EP | 1967358 A1 | 9/2008 |

(Continued)

OTHER PUBLICATIONS

International Search Report mailed Feb. 23, 2012 for PCT/KR2011/004945.

(Continued)

*Primary Examiner* — Elmito Breval
(74) *Attorney, Agent, or Firm* — Lowe Hauptman & Ham, LLP

(57) ABSTRACT

Disclosed herein is a method of manufacturing an insert sheet for an automobile interior material. The method includes: forming a surface treatment layer on a carrier film; forming a pattern-printed layer by printing a heat-resistant and light-resistant resin on the surface treatment layer to a thickness of 2 to 5 microns; forming an adhesive layer by laminating an acrylic adhesive on the pattern-printed layer to a thickness of 1 to 3 microns; laminating the adhesive layer such that the adhesive layer is placed on the surface of a base layer to which a transparent ABS sheet is applied, and heating the adhesive layer to combine the adhesive layer with the base layer; and removing the carrier film.

13 Claims, 8 Drawing Sheets

(51) Int. Cl.

| | |
|---|---|
| *B32B 37/02* | (2006.01) |
| *B32B 7/12* | (2006.01) |
| *B32B 27/06* | (2006.01) |
| *B32B 27/30* | (2006.01) |
| *B32B 27/34* | (2006.01) |
| *B32B 27/36* | (2006.01) |
| *B32B 27/40* | (2006.01) |
| *B29C 45/14* | (2006.01) |
| *B32B 37/00* | (2006.01) |
| *B32B 38/00* | (2006.01) |
| *B32B 37/12* | (2006.01) |
| *B29L 31/30* | (2006.01) |

(52) U.S. Cl.
 CPC ............ *B60Q1/00* (2013.01); *B29L 2031/302* (2013.01); *B29L 2031/3014* (2013.01); *B32B 37/12* (2013.01); *B32B 37/1284* (2013.01); *B32B 38/145* (2013.01); *B32B 2307/306* (2013.01); *B32B 2307/412* (2013.01); *B32B 2307/536* (2013.01); *B32B 2307/554* (2013.01); *B32B 2309/105* (2013.01); *B32B 2355/02* (2013.01); *B32B 2367/00* (2013.01); *B32B 2605/003* (2013.01); *B32B 2605/08* (2013.01); *Y10T 428/24868* (2015.01)

(56) References Cited

U.S. PATENT DOCUMENTS

| | | | |
|---|---|---|---|
| 2006/0240246 A1* | 10/2006 | Fukuda et al. | ................ 428/328 |
| 2007/0110948 A1 | 5/2007 | Lacock et al. | |
| 2007/0141353 A1 | 6/2007 | Neitzke | |
| 2009/0051078 A1 | 2/2009 | France | |
| 2010/0221509 A1 | 9/2010 | Suga | |
| 2011/0171433 A1 | 7/2011 | Lee et al. | |

FOREIGN PATENT DOCUMENTS

| | | |
|---|---|---|
| JP | 10329170 A | 12/1998 |
| JP | 2007-517686 | 7/2007 |
| KR | 10-2008-0078023 | 8/2008 |
| KR | 10-2009-0072864 | 7/2009 |
| KR | 10-2010-0034158 | 4/2010 |
| KR | 10-2011-0072788 | 6/2011 |
| WO | 2008032907 A1 | 3/2008 |
| WO | 2010036015 A2 | 4/2010 |
| WO | WO 2010036015 A3 * | 6/2010 |

OTHER PUBLICATIONS

European Search Report dated Dec. 16, 2013.
Japanese Notice of Allowance dated Aug. 5, 2014.
Chinese Office Action dated Apr. 30, 2014.

\* cited by examiner

INSERT SHEET FOR AN AUTOMOBILE INTERIOR MATERIAL, AND A PRODUCTION METHOD FOR THE SAME

CROSS REFERENCE TO RELATED APPLICATION

This application claims the priority of Korean Patent Application No. 10-2010-0073851, filed on Jul. 30, 2010 in the KIPO (Korean Intellectual Property Office). Further, this application is the National Phase application of International Application No. PCT/KR2011/004945 filed Jul. 6, 2011, which designates the United States and was published in Korean.

TECHNICAL FIELD

The present invention relates to an insert sheet for an automobile interior material which realizes an LED backlighting effect.

BACKGROUND ART

Insert decorative sheets are used for interior materials of vehicles, cases of home appliances, and the like, and various patterns and metallic textures have been realized and used through gravure printing in the related art. However, vehicle manufacturers continuously require special designs for indirect illumination effects with LED lighting.

Thus, in embodiments of the present invention, an insert sheet employs a transparent ABS sheet as a base substrate to realize a product through which light from an LED can pass, has a design pattern diversified through printing of various patterns, and allows injection molding using the transparent ABS sheet when assembling an interior part of a vehicle, thereby improving transmittance of LED lighting.

DISCLOSURE

Technical Problem

Embodiments of the present invention provide an insert sheet for an automobile interior material to which a transparent ABS sheet is applied in order to realize an indirect illumination effect with LED lighting, and a method of manufacturing the same.

Embodiments of the present invention provide an insert sheet for an automobile interior material, which uses a transparent ABS sheet as a base substrate to realize a product through which light from an LED can pass, has a design pattern diversified through printing of various patterns, and allows injection molding using the transparent ABS sheet when assembling an interior part of a vehicle, thereby improving transmittance of LED lighting, and a method of manufacturing the same.

The present invention is not limited to the above embodiments, and other embodiments will become apparent by those skilled in the art.

Technical Solution

One aspect of the present invention provides an insert sheet for an interior material for a vehicle, which includes: a surface treatment layer; a pattern-printed layer; an adhesive layer; and a base layer, in this order from the top of the insert sheet, wherein an indirect illumination effect by backlighting is provided to an interior of the vehicle by applying a transparent ABS sheet to the base layer.

The surface treatment layer may be formed by coating an acrylic resin coating liquid.

The acrylic resin coating liquid may be an acrylic resin solution having a solid content of 30% to 50%.

The surface treatment layer may have a thickness ranging from 1 μm to 20 μm.

The pattern-printed layer may be formed of an acrylic resin or an acrylic vinyl resin.

The adhesive layer may comprise at least one composition selected from among acrylic resins, urethane resins, ester resins, polyamide resins, and ethylene vinyl acetate resins.

The adhesive layer may be formed by gravure coating after the at least one composition selected from the resins is dissolved, or is formed by laminating an adhesive film through extrusion.

The adhesive layer may have a thickness ranging from 1 μm to 10 μm.

The adhesive layer may have a thickness ranging from 2 μm to 5 μm.

The transparent ABS sheet may have a transmittance of 80% or more.

The transparent ABS sheet may have thermal fluidity and heat resistant fluidity.

The base layer may have a thickness ranging from 200 μm to 600 μm.

The base layer has a thickness ranging from 350 μm to 500 μm.

Another aspect of the present invention provides an insert sheet for an interior material of a vehicle, which includes: a light source for backlighting; a base layer formed above the light source; an adhesive layer formed on the base layer; a pattern-printed layer formed on the adhesive layer; and a surface treatment layer formed on the pattern-printed layer, wherein an indirect illumination effect by backlighting of the light source is imparted to an interior of the vehicle by applying a transparent ABS sheet to the base layer.

A further aspect of the present invention provides a method of manufacturing an insert sheet for an interior material of a vehicle, which includes: forming a surface treatment layer on a carrier film; printing a heat-resistant and light-resistant resin on the surface treatment layer to forming a pattern-printed layer; laminating an acrylic adhesive on the pattern-printed layer to form an adhesive layer; laminating the adhesive layer such that the adhesive layer is placed on a surface of the base layer to which a transparent ABS sheet is applied, and heating the adhesive layer to combine the adhesive layer with the base layer; and removing the carrier film.

The carrier film may be formed of polyethylene terephthalate (PET).

Details of other embodiments will be described in the following description with reference to the accompanying drawings.

The above and other aspects, features, and advantages of the invention will become apparent from the detailed description of the following embodiments in conjunction with the accompanying drawings. It should be understood that the present invention is not limited to the following embodiments and may be embodied in different ways, and that the embodiments are provided to provide complete disclosure of the invention and a thorough understanding of the invention to those skilled in the art. The scope of the invention is defined only by the claims. Like components will be denoted by like reference numerals throughout the specification.

Advantageous Effects

According to one embodiment of the present invention, a transparent ABS sheet is applied to an insert sheet for an automobile interior material to realize an indirect illumination effect with LED lighting.

According to one embodiment of the present invention, the insert sheet employs a transparent ABS sheet as a base material to realize a product through which light from an LED can pass, has a design pattern diversified through printing of various patterns, and allows injection molding using the transparent ABS resin when assembling an interior material part for a vehicle, thereby improving transmittance of LED lighting.

According to one embodiment of the present invention, the insert sheet may be applied to components such as a center console, a gearbox, and door trim, and may be manufactured through forming, trimming and injection-molding, and may be provided with LED lighting thereon.

BEST MODE

Hereinafter, an insert sheet for an automobile interior material according to one embodiment of the present invention will be described in detail.

Figure 1:
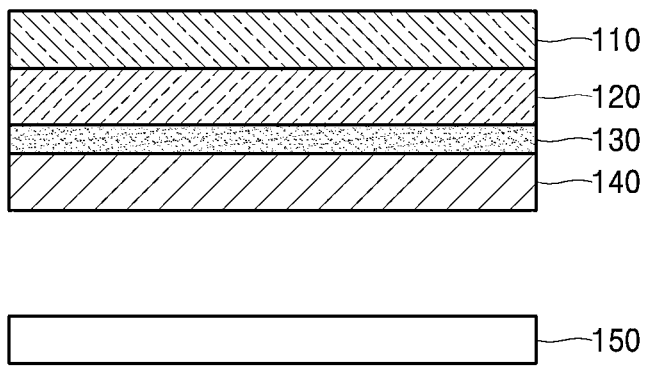
FIG. 1 is a sectional view of an insert sheet for an automobile interior material according to one embodiment of the present invention.

FIG. 1 is a sectional view of an insert sheet for an automobile interior material according to one embodiment of the present invention.

As shown in FIG. 1, an insert sheet 100 for an automobile interior material according to one embodiment of the present invention includes a surface processing layer, a pattern-printed layer 120, an adhesive layer 130, and a base layer 140 in this order from the top of the insert sheet.

The surface processing layer 110 is formed by coating an acrylic resin coating liquid. Here, the acrylic resin coating liquid may be an acrylic resin solution having a solid content of 30% to 50%.

Here, the acrylic resin may be used to easily coat a material such as a thermoplastic resin, which needs to be processed, and may be easily dissolved in an organic solvent. Further, the acrylic resin may have excellent coating strength and formability.

The surface processing layer 110 may have a thickness of 1 μm to 20 μm. When the thickness of the surface processing layer 110 is less than 1 μm, the surface coating layer can have deteriorated properties. In particular, surface hardness and wear resistance of the surface coating layer can be lowered. On the other hand, when the thickness of the surface processing layer 110 exceeds 20 μm, post-processing efficiency such as formability and injection-molding efficiency can be lowered due to an excessive thickness of the surface coating layer.

The pattern-printed layer 120 may be formed of a composition, such as an acrylic resin or an acryl vinyl resin, which has excellent heat resistance and light resistance.

The pattern-printed layer 120 may have a thickness of 1 μm to 5 μm. The pattern-printed layer 120 may be printed using a gravure printing roll (3 degrees to 10 degrees) having a certain pattern.

The adhesive layer 130 may comprise at least one composition selected from among acrylic resins, urethane resins, ester resins, polyamide resins, and ethylene vinyl acetate resins.

The adhesive layer 130 may be formed by coating at least one composition selected from among the resins. For example, the adhesive layer 130 is formed by gravure coating of a solution of the at least one composition.

The adhesive layer 130 preferably has a thickness ranging from 1 μm to 10 μm more preferably, from 2 μm to 5 μm. When the thickness of the adhesive layer 130 is less than 1 bonding force is lowered when the adhesive layer 130 is bonded to a colored film. On the other hand, when the thickness of the adhesive layer 130 exceeds 10 blocking occurs, thereby making it difficult to perform roll winding and machining.

The base layer 140 forms a base of the insert sheet according to the embodiment. The base layer 140 may be formed of a transparent ABS sheet.

The transparent ABS sheet may have a transmittance of 80% or more. Accordingly, the transparent ABS sheet may have characteristics wherein light from a light source (LED) of backlighting on a lower side can easily pass through the transparent ABS sheet. Further, the transparent ABS sheet has such excellent thermal fluidity and thus exhibit excellent heat resistant fluidity which prevents gate burning after injection-molding.

The base layer 140 may have a thickness ranging from 200 μm to 600 μm, preferably from 350 μm to 500 μm. When the thickness of the base layer 140 is less than 200 μm, gate burn can occur during injection-molding, and when the thickness of the base layer 140 exceeds 600 μm, it is difficult to form and injection-mold the base layer 140.

A light source 150 is formed below the base layer 140. The light source 150 irradiates light, which passes through the base layer 140. Accordingly, an indirect illumination effect by backlighting of the light source 150 can be imparted to an interior of the vehicle.

Hereinafter, a method of manufacturing an insert sheet for an automobile interior material according to one embodiment of the present invention will be described in detail.

FIGS. 2 to 6 are sectional views illustrating a method of manufacturing an insert sheet for an automobile interior material according to one embodiment of the present invention.

Figure 2:
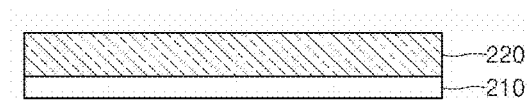
FIGS. 2 to 6 are sectional views illustrating a method of manufacturing an insert sheet for an automobile interior material according to one embodiment of the present invention.

First, referring to FIG. 2, a surface treatment layer 220 is formed on a carrier PET film 210. Here, the surface treatment layer 220 may be formed by coating an acrylic resin coating liquid. Preferably, the acrylic resin coating liquid is an acrylic resin solution having a solid content of 30% to 50%.

Preferably, the surface treatment layer 220 is formed to have a thickness ranging from 1 μm to 20 μm. In the present embodiment, the surface treatment layer 220 is formed to have a thickness ranging from 2 μm to 5 μm.

Figure 3:
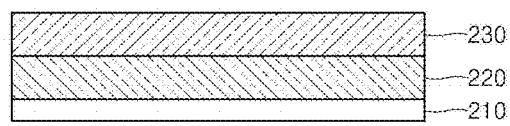

Next, referring to FIG. 3, a heat-resistant and light-resistant resin is printed on the surface treatment layer 220 to form a pattern-printed layer 230. Here, the heat-resistant and light-resistant resin may be an acrylic resin or an acrylic vinyl resin.

Figure 4:
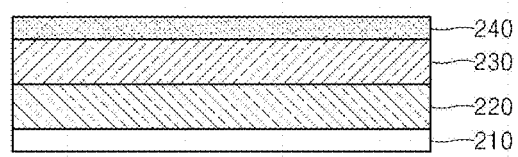

Next, referring to FIG. 4, an adhesive layer 240 is formed by laminating an acrylic adhesive on the pattern-printed layer 230.

The adhesive layer 240 may be formed of at least one composition selected from acrylic resins, urethane resins, ester resins, polyamide resins, and ethylene vinyl acetate resins.

The adhesive layer may be formed by gravure coating of a solution of the at least one composition.

The adhesive layer 240 may be formed to have a thickness ranging from 1 μm to 10 μm. In this embodiment, the thickness of the adhesive layer 240 ranges from 1 μm to 3 μm.

Figure 5:
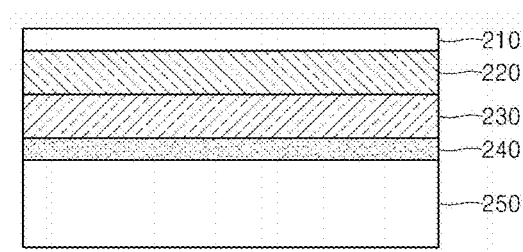

Next, referring to FIG. 5, the adhesive layer 240 is laminated such that the adhesive layer 240 is placed on the surface of the base layer to which a transparent ABS sheet is applied, and then is heated to combine the adhesive layer 240 with the base layer 250.

The transparent ABS sheet may have a transmittance of 80% or more. Further, the transparent ABS sheet may have excellent thermal fluidity and thus exhibits excellent heat resistant fluidity which prevents gate burning even after injection-molding.

Figure 6:
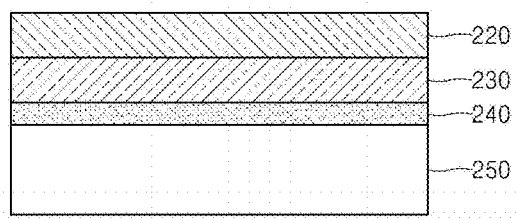

Next, referring to FIG. 6, the carrier PET film 210 attached to the surface treatment layer 220 is removed.

Figure 7:
FIGS. 7 and 8 illustrate examples in which the insert sheet for an automobile interior material according to the embodiment of the present invention is applied to a vehicle.
Figure 8:
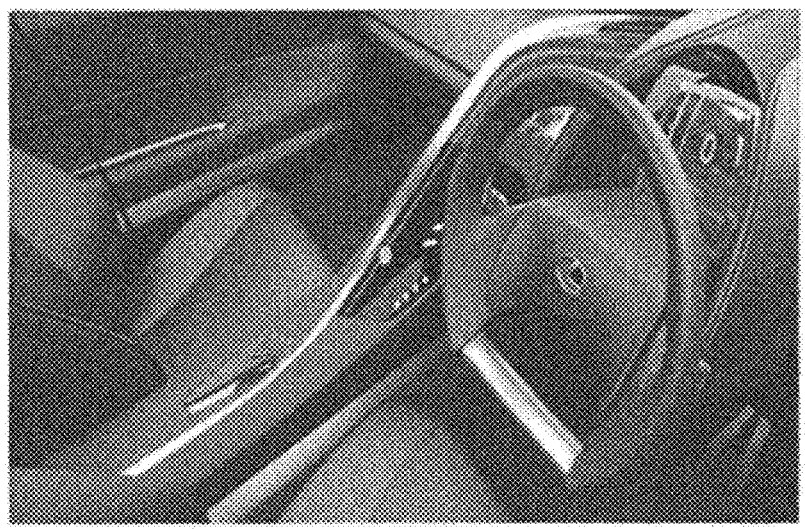

FIGS. 7 and 8 illustrate examples in which the insert sheet for an automobile interior material according to the embodiment of present invention is applied to a vehicle.

As shown in FIGS. 7 and 8, the insert sheet can realize an indirect illumination effect of an interior of a vehicle through indirect light transmittance. Accordingly, a high class design can be provided to an interior of a vehicle, thereby providing an aesthetically pleasing appearance to consumers.

Hereinafter, the present invention will be described in detail with reference one example.

EXAMPLE

A surface treatment layer is formed on one surface of a carrier PET film having a thickness of 50 μm. To this end, the surface treatment layer is formed to a thickness of 10 μm by mixing 2 parts by weight of an isocyanate curing agent with 100 parts by weight of a solution obtained by dissolving an acrylic resin in methylethylketone to have a solid content of 35% in the solution.

A composition having 5 parts by weight of aluminum paste in an acrylic resin having a solid content of 35% was deposited on the surface treatment layer to form a metallic ink layer (pattern-printed layer). A paint film was formed of the composition to a thickness of 1 μm to 3 μm through gravure coating.

A paint film is formed to a thickness of 2 μm on the metallic ink layer using a mixture, which is prepared by mixing 0.6 parts by weight of an isocyanate curing agent with 100 parts by weight of a solution obtained by dissolving a polyester bonding resin in methyl ethyl ketone to have a solid content of 35% in the solution.

In order to manufacture an insert sheet through which light from an LED (light source) can pass, a transparent ABS sheet (TR556, LG Chemical Co., Ltd.) having a thickness of 500 μm is prepared. Then, the film having an adhesive layer is stacked on the transparent ABS sheet and heated to be attached thereto, followed by removing the carrier PET film.

Then, the sheet is subjected to trimming and injection molding is performed using the transparent ABS resin. An LED light source is placed inside the injection-molded product, thereby realizing an illumination effect.

Although some embodiments have been described, it will be understood by those skilled in the art that various modifications, changes, alterations and equivalent embodiments can be made without departing from the scope of the present invention. Therefore, the scope of the present invention is not limited by the above embodiments and should be defined by the accompanying claims and equivalents thereof.

Although some embodiments have been described with reference to the accompanying drawing, it will be understood by those skilled in the art that these embodiments are provided for illustrative purposes only, and various modifications, changes, alterations and equivalent embodiments can be made without departing from the scope of the present invention. Therefore, the scope and sprit of the present invention should be defined only by the accompanying claims and equivalents thereof.

The invention claimed is:

1. An insert sheet for an interior material of a vehicle, comprising:
    a surface treatment layer;
    a pattern-printed layer;
    an adhesive layer;
    a base layer; and
    a light source for light emitted diode (LED) backlighting,
        in this order from the top of the insert sheet,
    wherein the base layer is a transparent acrylonitrile butadiene styrene (ABS) sheet having a thickness ranging from 350 μm to 500 μm, such that the transparent ABS sheet imparts an indirect illumination effect by backlighting to an interior of the vehicle,
    wherein the pattern-printed layer is directly attached to the bottom of the surface treatment layer and is directly attached to the top of the adhesive layer,
    wherein the transparent ABS sheet has a transmittance of 80% or more,
    wherein the pattern-printed layer is a metallic ink layer formed from a composition including aluminum paste in an acrylic resin or an acrylic vinyl resin, and
    wherein the pattern-printed layer has a thickness ranging from 1 μm to 5 μm.

2. The insert sheet according to claim 1, wherein the surface treatment layer is formed by coating an acrylic resin coating liquid.

3. The insert sheet according to claim 2, wherein the acrylic resin coating liquid is an acrylic resin solution having a solid content of 30% to 50%.

4. The insert sheet according to claim 1, wherein the surface treatment layer has a thickness ranging from 1 μm to 20 μm.

5. The insert sheet according to claim 1, wherein the adhesive layer comprises at least one composition selected from acrylic resins, urethane resins, ester resins, polyamide resins, and ethylene vinyl acetate resins.

6. The insert sheet according to claim 1, wherein the adhesive layer has a thickness ranging from 1 μm to 10 μm.

7. The insert sheet according to claim 6, wherein the adhesive layer has a thickness ranging from 2 μm to 5 μm.

8. A method of manufacturing an insert sheet for an interior material of a vehicle, the method comprising:
    forming a surface treatment layer on a carrier film;
    printing a heat-resistant and light-resistant resin directly on the surface treatment layer to form a pattern-printed layer;
    laminating an adhesive directly on the pattern-printed layer to form an adhesive layer;
    laminating the adhesive layer on a surface of a base layer that is a transparent acrylonitrile butadiene styrene (ABS) sheet having a thickness ranging from 350 μm to 500 μm, and heating the adhesive layer to combine the adhesive layer with the base layer;
    removing the carrier film; and forming a light source for light emitted diode (LED) backlighting below the base layer, wherein the transparent ABS sheet has a transmittance of 80% or more, wherein the pattern-printed layer is a metallic ink layer formed from a composition including aluminum paste in an acrylic resin or an acrylic vinyl resin, and wherein the pattern-printed layer has a thickness ranging from 1 μm to 5 μm.

9. The method according to claim 8, wherein the carrier film is formed of polyethylene terephthalate (PET).

10. The method according to claim 8, wherein the surface treatment layer is formed by coating an acrylic resin coating liquid.

11. The method according to claim 10, wherein the acrylic resin coating liquid is an acrylic resin solution having a solid content of 30% to 50%.

12. The method according to claim 8, wherein the adhesive layer comprises at least one composition selected from acrylic resins, urethane resins, ester resins, polyamide resins, and ethylene vinyl acetate resins.

13. The method according to claim 12, wherein the adhesive layer is formed by gravure coating of a solution of the at least one composition.

* * * * *